(12) United States Patent
Maier

(10) Patent No.: US 11,787,107 B2
(45) Date of Patent: Oct. 17, 2023

(54) LIFTING SYSTEM FOR DEVICE AND A METHOD FOR GENERATIVELY MANUFACTURING A THREE-DIMENSIONAL OBJECT

(71) Applicant: EOS GmbH Electro Optical Systems, Krailling (DE)

(72) Inventor: Horst Maier, Planegg (DE)

(73) Assignee: EOS GmbH Electro Optical Systems, Krailling (DE)

( * ) Notice: Subject to any disclaimer, the term of this patent is extended or adjusted under 35 U.S.C. 154(b) by 34 days.

(21) Appl. No.: 16/633,229

(22) PCT Filed: Jul. 5, 2018

(86) PCT No.: PCT/EP2018/068221
§ 371 (c)(1),
(2) Date: Jan. 23, 2020

(87) PCT Pub. No.: WO2019/020340
PCT Pub. Date: Jan. 31, 2019

(65) Prior Publication Data
US 2020/0198235 A1    Jun. 25, 2020

(30) Foreign Application Priority Data

Jul. 28, 2017 (DE) .......................... 102017213078.4

(51) Int. Cl.
*B29C 64/153* (2017.01)
*B33Y 10/00* (2015.01)
(Continued)

(52) U.S. Cl.
CPC .......... *B29C 64/153* (2017.08); *B22F 12/222* (2021.01); *B22F 12/41* (2021.01);
(Continued)

(58) Field of Classification Search
CPC ... B29C 64/232; B29C 64/153; B29C 64/245; B29C 64/255; B33Y 10/00; B33Y 30/00;
(Continued)

(56) References Cited

U.S. PATENT DOCUMENTS

2007/0075461 A1* 4/2007 Hunter .................. B29C 64/245
425/174
2008/0001331 A1   1/2008 Ederer
(Continued)

FOREIGN PATENT DOCUMENTS

CN   204584274 U * 8/2015 ........... B29C 64/268
DE   102006030350     1/2008
(Continued)

OTHER PUBLICATIONS

International Search Report for Application No. PCT/EP2018/068221, dated Oct. 9, 2018, 2 pages.

*Primary Examiner* — Leith S Shafi
*Assistant Examiner* — Xinwen Ye
(74) *Attorney, Agent, or Firm* — Seyfarth Shaw LLP

(57) ABSTRACT

A lifting system serves for use in a manufacturing device for generatively manufacturing a three-dimensional object by layerwise application and selective solidification of a building material. The manufacturing device includes building base on which the object is to be built upon a building surface. The lifting system includes a holding device suitable for holding and height-adjusting the building base. In a position corresponding to an operating state within the manufacturing device, the holding device is arranged in such a way that the building base is attached to the underside of the holding device so that the building surface faces towards the holding device.

19 Claims, 3 Drawing Sheets

(51) Int. Cl.
  *B33Y 30/00* (2015.01)
  *B29C 64/232* (2017.01)
  *B28B 1/00* (2006.01)
  *B22F 12/00* (2021.01)
  *B22F 12/41* (2021.01)
  *B22F 10/28* (2021.01)
  *B22F 12/30* (2021.01)
  *B22F 12/42* (2021.01)
  *B22F 12/67* (2021.01)

(52) U.S. Cl.
  CPC ............ *B28B 1/001* (2013.01); *B29C 64/232* (2017.08); *B33Y 10/00* (2014.12); *B33Y 30/00* (2014.12); *B22F 10/28* (2021.01); *B22F 12/224* (2021.01); *B22F 12/30* (2021.01); *B22F 12/42* (2021.01); *B22F 12/67* (2021.01)

(58) Field of Classification Search
  CPC ........ B22F 12/00; B22F 10/10; B22F 12/222; B22F 12/60; B22F 12/63; B22F 12/67; B22F 12/30; B28B 1/001

USPC ........................................................ 264/497
  See application file for complete search history.

(56) References Cited

U.S. PATENT DOCUMENTS

2008/0053998 A1    3/2008  Hochsmann et al.
2017/0246808 A1*   8/2017  Hochsmann ............ B66F 19/00

FOREIGN PATENT DOCUMENTS

| DE | 102007014968 | 10/2008 | |
| DE | 102009020987 | 11/2010 | |
| DE | 102012014840 | 1/2014 | |
| EP | 1790463 | 5/2007 | |
| EP | 1882580 | 9/2010 | |
| WO | WO-2008116627 A1 * | 10/2008 | .............. B22F 3/003 |
| WO | WO-2017106082 A1 * | 6/2017 | ............. B33Y 10/00 |

* cited by examiner

LIFTING SYSTEM FOR DEVICE AND A METHOD FOR GENERATIVELY MANUFACTURING A THREE-DIMENSIONAL OBJECT

TECHNICAL FIELD OF THE INVENTION

The present invention relates to a lifting system for a manufacturing device or a method for generatively manufacturing a three-dimensional object by layer-wise application and selective solidification of a building material, preferably a powder, wherein the manufacturing device comprises a building base on which the object is to be built on a building surface.

BACKGROUND OF THE INVENTION

Devices and methods of this kind are used for example in rapid prototyping, rapid tooling or additive manufacturing. An example of such a process is known as "selective laser sintering or laser melting". Therein, a thin layer of a pulverulent building material is repeatedly applied and the building material is selectively solidified in each layer by selective irradiation with a laser beam on locations corresponding to a cross-section of the object to be manufactured.

Before the next layer is applied, a building base on which the object is built is lowered by a predetermined height. The amount of the predetermined height determines the thickness of the applied layer.

For the purpose of lowering, the building base is held by a height-adjustable support. According to the state of the art, the drive for height adjustment of the beam is located below the support.

EP 1 882 580 B1 for example describes a system for the assembly of a shaped body in which the object is built inside an interchangeable container insertable into the system. Therein, the building base is held by supporting arms which reach through recesses in the container wall from the side and are driven by a spindle drive with a threaded spindle arranged rotatably outside in the container wall.

SUMMARY OF THE INVENTION

The object of the present invention is to provide an alternative or improved device or an alternative or improved method for generatively manufacturing a three-dimensional object by applying and selectively solidifying a building material layer by layer, wherein in particular preferably a building height of the object to be manufactured can be increased without deteriorating the operability.

This object is achieved by a lifting system according to claim 1, a manufacturing device according to claim 6 and a manufacturing method according to claim 12. Further developments of the invention are indicated in the subclaims, respectively. The method may also be further developed by the features of the devices mentioned below or in the subclaims, or vice versa, or the features of the devices may be used for further development among themselves.

The lifting system according to the invention serves for use in a manufacturing device for generatively manufacturing a three-dimensional object by layerwise application and selective solidification of a building material, preferably a powder, wherein the manufacturing device comprises a building base on which the object is to be built on a building surface. The lifting system includes a holding device which is suitable for holding and height adjusting the building base. In a position corresponding to an operating state within the manufacturing device, the holding device is arranged in such a way that the building base is attached to the underside of the holding device so that the building surface faces towards the holding device. With such a lifting system, for example, the working range of the device can be increased because the building base can be lowered further down than in the case of holding the building base from below. Various types of powder may be used as the building material, especially metal powder, plastic powder, ceramic powder, sand, filled or mixed powders. Instead of powder, other suitable materials can also be used as a building material.

Preferably, the lifting system also comprises a spindle drive for the height adjustment of the holding device. This allows, for example, a precise adjustment of the holding device.

Preferably, the spindle drive comprises a drive unit which is located on the holding device. In this way, for example, a rotary movement of a spindle nut can easily be realized.

Preferably, the spindle drive comprises a spindle axis, which in the position corresponding to the operating state within the manufacturing device is located above the position of the holding device provided for holding the building base. In this way, for example, the space below the position provided for holding the building base can be kept free, thus increasing the range of adjustment of the building base. The "above" is not restricted to a position vertically above the location provided for holding the building base, but may also be laterally offset, for example with a cantilever arm. This definition of "above" in relation to the holding device also applies generally within the scope of the invention.

Preferably, the holding device is formed as a frame which has a free space in its interior. In this way it may be achieved, for example, that an operation of components acting within the free space is not impaired by the holding device.

The manufacturing device according to the invention serves for the generative manufacturing of a three-dimensional object by layerwise application and selective solidification of a building material, preferably a powder. The device comprises a building base on which the object is to be built upon, a lifting system according to the invention for holding and height-adjusting the building base, a recoater for applying the building material to the building base or a previously applied building material, and a solidification device for selectively solidifying the applied building material at locations corresponding to a cross-section of the object to be manufactured. The manufacturing device is adapted and/or controlled to repeat the steps of application and selective solidification until the object is finished and to lower the building base by means of the holding device by a predetermined height before each step of application of a new layer. With such a manufacturing device, for example, the increased working range of the lifting system can be used to manufacture taller objects.

Preferably, the manufacturing device further comprises a spindle drive for the height adjustment of the holding device, wherein the spindle drive comprises a spindle axis which is arranged above the solidification device. In this way, for example, a precise adjustability of the height of the holding device can be achieved, and the space below the location provided for holding the building material can be kept free, thus increasing the range of adjustment of the building base. Again, "above" is not restricted to a position vertically above the point provided for holding the building document, but can also be laterally offset, for example with a cantilever.

Preferably, the holding device is formed as a frame having a free space in its interior, and the solidification device or at least a part of it is placed in this free space inside the frame.

In this way it can be achieved, for example, that an operation of the solidification device is not impaired by the holding device.

Preferably, the solidification device comprises (in particular: is) an irradiation device capable of selectively directing a radiation suitable for solidifying the building material to the locations of the applied building material corresponding to the cross-section of the object to be manufactured. In this way, for example, the building material can be solidified quickly and precisely.

Preferably, the manufacturing device further comprises a building shaft into which the building base can be lowered. In this way, for example, a laterally delimited space can be provided for building the object.

Preferably, the building base is lowerable into a direction towards a bottom, preferably down to the bottom of the building shaft. In this way, for example, the largest possible adjustment range of the building base can be achieved.

The manufacturing method according to the invention serves for the generative manufacturing of a three-dimensional object by layerwise application and selective solidification of a building material, preferably a powder, on a building base held by a lifting system according to the invention. The method comprises the steps of lowering the building base by means of the holding device by a predetermined height, applying a layer of the building material to the building base or a previously applied layer by means of a recoater, and solidifying the applied layer selectively at locations corresponding to a cross-section of the object to be manufactured by means of a solidification device. The steps of lowering, applying and solidifying are repeated until the object is completed. With such a method, for example, the increased working range of the lifting system can be used to manufactured taller objects.

BRIEF DESCRIPTION OF THE DRAWINGS

Further features and functionalities of the invention arise from the description of implementation examples based on the enclosed drawings.

DETAILED DESCRIPTION OF THE EMBODIMENTS

Figure 1:
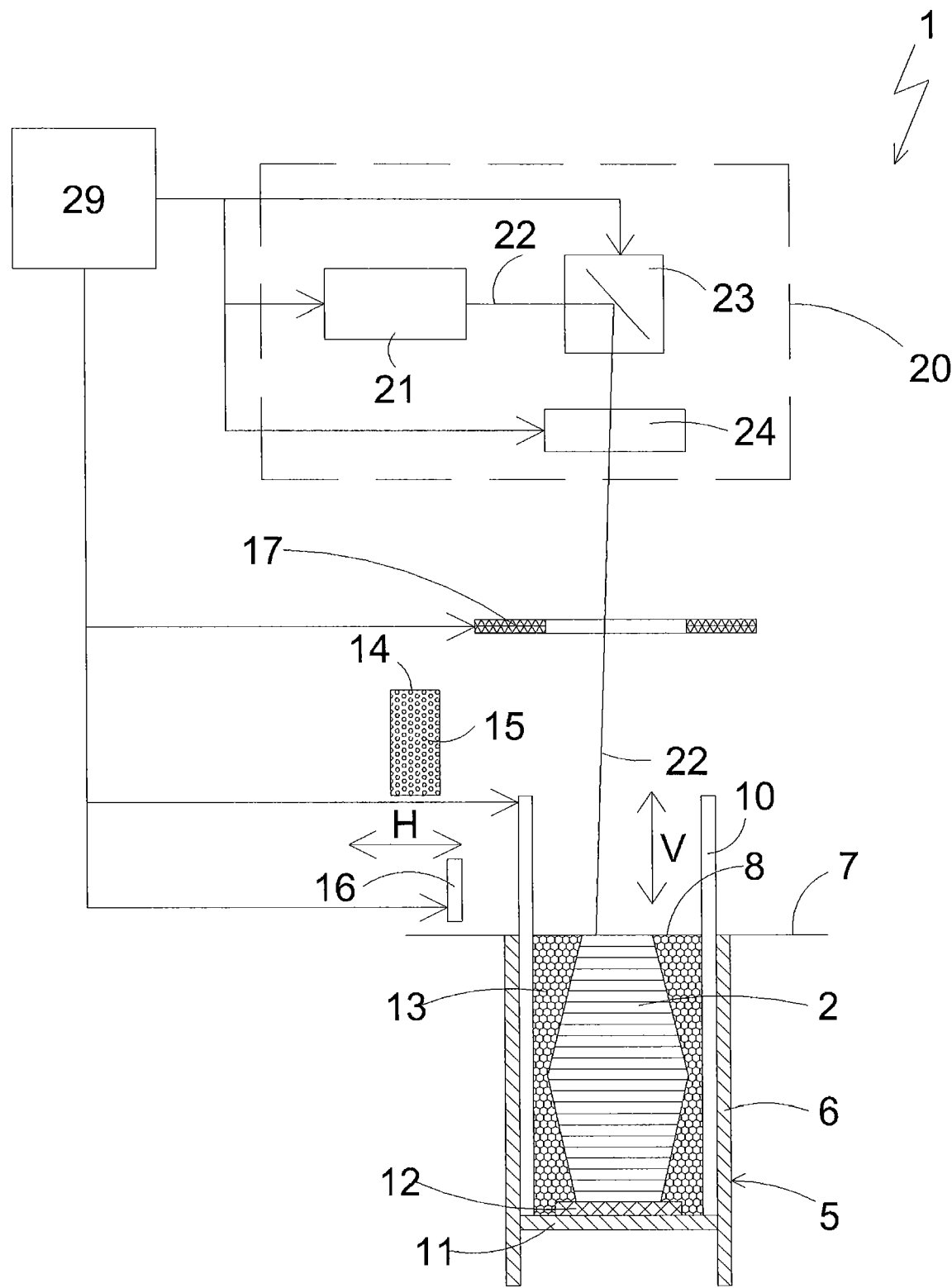
FIG. 1 is a schematic, partially sectional view of a device for the generative manufacturing of a three-dimensional object according to an embodiment of the present invention.

A first embodiment of the present invention will be described below with reference to FIG. 1. The device illustrated in FIG. 1 is a laser sintering or laser melting device 1. For building the object 2, the device 1 includes a container 5 which is open at the top and has a container wall 6. The upper border of the container 5 defines a working plane 7, wherein the portion of the working plane 7 lying within the opening at the top that can be used for building the object 2 is referred to as a build area 8.

On a holding device 10 movable in a vertical direction V, a base plate 11 is attached, which closes the container 5 downwards and thus forms its bottom. Depending on the powder and process used, a building platform 12 on which the object 2 is built may also be attached as a building base to the base plate 11. However, the object 2 may also be built on the base plate 11 which then itself serves as the building base. In FIG. 1, the object 2 which is to be formed in the container 5 on the building platform 12 is illustrated below the working plane 7 in an intermediate state, having a plurality of solidified layers and being surrounded by building material 13 remaining unsolidified.

The laser sintering device 1 further comprises a storage container 14 for a pulverulent building material 15 which is solidifyable by an electromagnetic radiation, and a recoater 16 which is movable in a horizontal direction H, for applying the building material 15 within the build area 8. Preferably, the recoater 16 extends across the entire area to be applied in a direction traverse to its movement direction.

Optionally, a radiation heater 17 for heating the applied building material 15 is arranged in the processing chamber. An infrared lamp may for example be provided as the radiation heater 17.

The laser sintering device 1 further comprises an irradiation device 20 having a laser 21 which generates a laser beam 22 which is deflected by way of a deflecting device 23 and which is focused by way of a focusing device 24 to the working plane 7

The laser sintering device 1 further comprises a control unit 29 by way of which the individual component parts of the device 1 are controlled in a coordinated manner for carrying out the building process. As an alternative, the control unit may partially or entirely be arranged outside of the device. The control unit may include a CPU, the operation of which is controlled by a computer program (software). The computer program may be stored on a storage medium separate from the device, from where it may be loaded into the device, especially into the control unit.

In operation for applying a powder layer, the base plate 11 first is lowered by means of the holding device 10 by a predetermined height corresponding to the desired layer thickness. The recoater 16 is first moved to the storage container 14 and receives from it an amount of building material 15 which is sufficient for applying a layer. Then, it moves across the build area 8 where it applies a thin layer of the pulverulent building material 15 onto the building base or a previously applied powder layer, and pulls it apart to form a powder layer. The application is carried out at least across the entire cross-section of the object 2 to be manufactured, preferably across the entire build area 8, i.e. the area delimited by the container wall 6. Optionally, the pulverulent building material 15 is heated by means of the radiation heater 17 to a working temperature.

Subsequently, the cross section of the object 2 to be manufactured is scanned by the laser beam 22 so that the pulverulent building material 15 is solidified at the locations corresponding to the cross section of the object 2 to be manufactured. Therein, the powder grains at those locations are partially or entirely melted by the energy introduced by the radiation so that after cooling, they are agglutinated to each other to form a solid body. These steps are repeated until the object has been finished and can be removed from the processing chamber.

According to the present invention, the holding device 10 is arranged in such a way that the building base (base plate 11 and/or building platform 12, in the following description for the sake of simplicity only the base plate 11 is mentioned) is attached to the underside of the holding device 10 in such a way that its building surface serving to build up the object points upwards, i.e. into the direction of the holding device.

Figure 2:
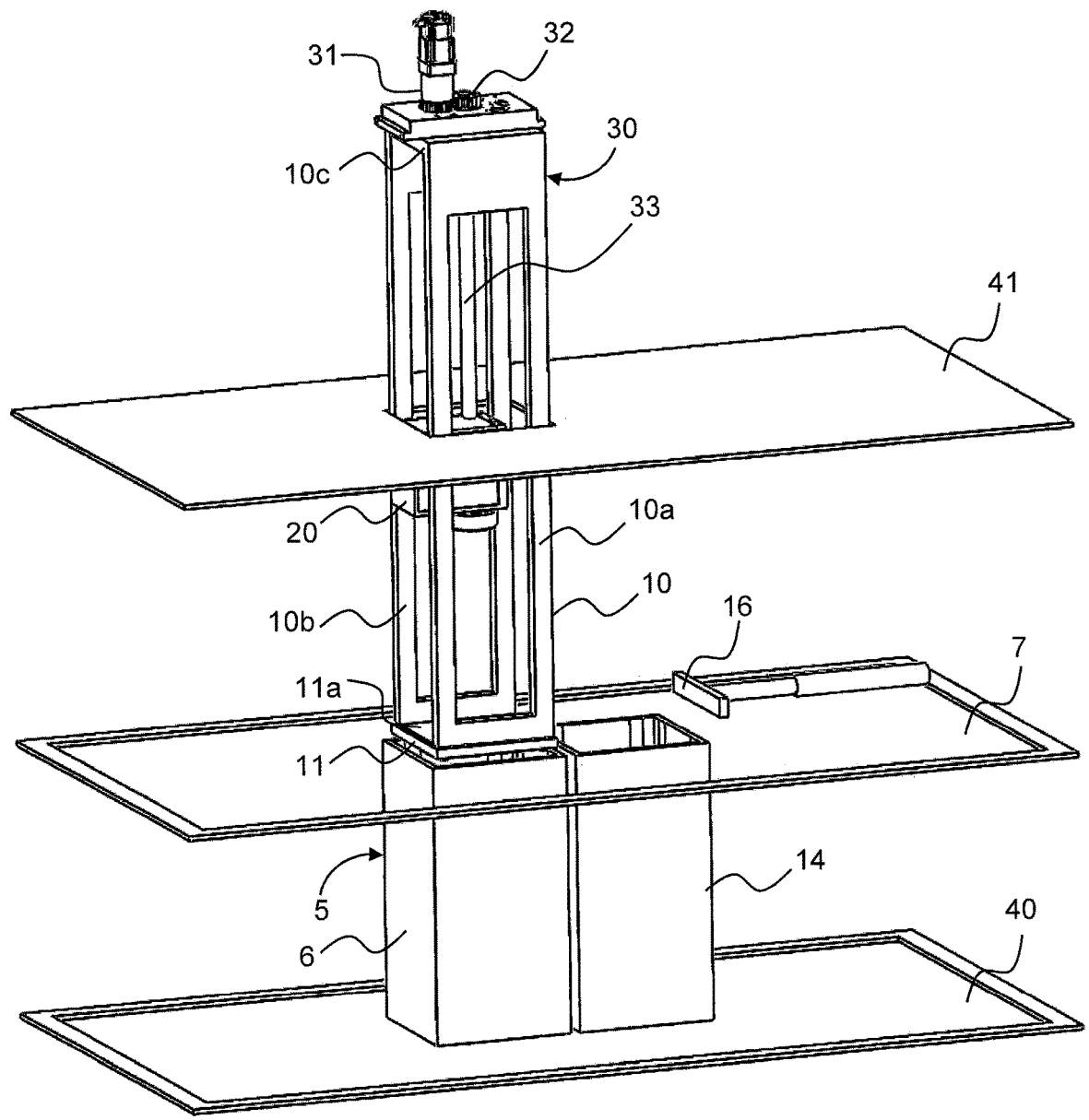
FIG. 2 is a schematic perspective view of a lifting system included in the device shown in FIG. 1 according to an embodiment of the present invention in a state removed from a building shaft.

An example of such an arrangement is described below with reference to FIGS. 2 and 3. In these figures, the container 5 is shown with a rectangular cross-section, but it may also have any other cross-section. Because of its vertical arrangement and its shape as a cavity surrounded by walls 6, it is also called a building shaft. FIG. 2 shows a lifting system 30 in a state removed from the building shaft 5 and FIG. 3 in a state inserted into the building shaft 5.

The storage container 14 in this embodiment is also formed as a shaft (dosing shaft), in which the building material 15 is pressed upwards by a (not shown) ram and then pushed across the working level 7 by the recoater 16. The building shaft and the powder shaft extend to the bottom level 40 of the device.

The exposure device 20 is fixedly connected to the device 1 at the optics level 41. This optics level is used in FIGS. 2 and 3 to illustrate the different operating positions of the lifting system 30.

The lifting system 30 in this embodiment is formed as a portal lifting system. This means that the holding device 10 is formed as a portal with two side parts 10a, 10b running vertically and parallel to each other and a horizontal connecting part 10c connecting their upper ends.

The holding device 10 is vertically adjustable by means of a spindle drive formed by a drive unit 31, a spindle nut 32 and a spindle axis 33. For this purpose the drive unit 31 and the spindle nut 32 are arranged on the connecting part 10c. The spindle nut 32 is rotatably mounted and can be driven into rotation by the drive unit 31. A spindle axis 33 fixedly connected to the device 1 runs through the spindle nut 32, so that the rotation of the spindle nut 32 is converted into a vertical movement of the holding device 10.

There is a free space between the side parts 10a and 10b. Since the spindle axis is located above the exposure device 20, the irradiation device 20 is located in this free space between the side parts 10a and 10b. During the vertical movement of the holding device 10, these side parts therefore move laterally past the irradiation device 20 and thus do not impair its operation. The recoater 16 also moves through this free space to apply the building material and is therefore not hindered by the holding device 10.

Before starting the manufacturing of an object, the base plate 11, which serves as a building support, is attached to the underside of the holding device 10 in such a way that its building surface 11a, which serves to build up the object 2, points upwards, i.e. towards the holding device 10. The holding device 10 thus acts on the base plate 11 from above. The base plate 11 can be fastened to the holding device 10 with any known fastening means, for example by screwing.

First of all, the base plate 11 is inserted into the building shaft 5 by means of a vertical movement of the holding device 10 to such an extent that the first layer of the building material can be applied and possibly selectively solidified. Step by step the base plate 11 is then lowered further into the building shaft 5 for each further layer until the object is completed.

Figure 3:
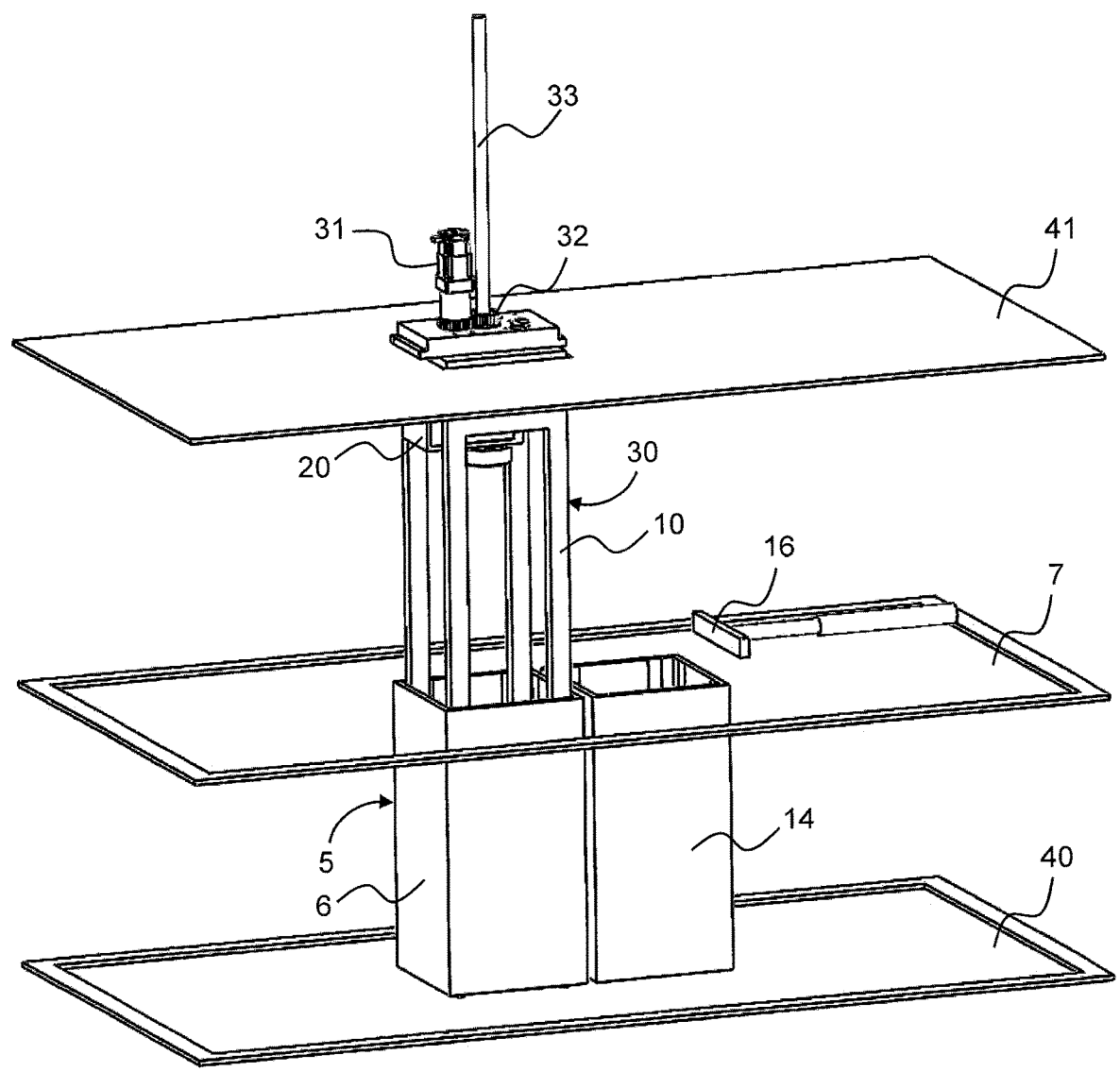
FIG. 3 is a schematic perspective representation of the lifting system shown in FIG. 2 in a state of being inserted into a building shaft.

FIG. 3 shows the lifting system 30 in a state when it is inserted into the building shaft 5. For the sake of clarity, the object and the building material that has remained unsolidified have been omitted. While the connecting part 10c of the holding device 10 is far above the optics plane 41 in the position shown in FIG. 2, it is almost in the optics plane 41 in the position shown in FIG. 3. Preferably, the lifting system 30 is designed in such a way that the base plate 11 can be lowered to the ground level 40.

When the building base 11 is attached to the underside of the holding device 10 in accordance with the invention, the entire height of the building shaft 5 can be used for the manufacturing of the object 2. Thus, taller components can be manufactured with the same height of the working plane than if the building base is held from below and the drive for height adjustment is arranged below the building base. With such an arrangement, the working plane would have to be raised for taller components so that, for example, a platform would be required for the operator to operate the machine.

By holding the building base from above, on the other hand, the working area of the device is lower and the space below can therefore be better used to build taller components without having to increase the working area for the operator.

Holding the building base from above can also be accomplished in a different way than by using a portal-shaped holding device. Instead of two side parts, for example, more than two elements (e.g. posts) may be attached to the building base, or it may be held by ropes.

While, according to the above description, the entire exposure device is located in the free space between the side parts, only one part may be located there, for example a scanner formed by a deflecting and focusing device, while other parts, for example the laser producing the laser beam, may be located outside the lifting system and the laser beam is then guided, for example by means of an optical fiber, to the scanner.

Although the present invention has been described with reference to a laser sintering or laser melting device, it is not restricted to laser sintering or laser melting. It may be applied to any method for the additive manufacturing of a three-dimensional object by applying and selectively solidifying a building material layer-by-layer.

The irradiation device may comprise for example one or more gas or solid state lasers or any other type of laser such as laser diodes, especially VCSEL (Vertical Cavity Surface Emitting Laser) or VECSEL (Vertical External Cavity Surface Emitting Laser), or a row of those lasers. In general, any device by which energy in form of wave or particle radiation can be selectively applied onto a layer of the building material may be used as an irradiation device. Instead of a laser, another light source, an electron beam or any other energy or radiation source which is suitable for solidifying the building material may be used, for example. Instead of the deflection of a beam, irradiation by means of a moveable row irradiator may be used. The invention may also be applied to selective mask sintering, in which a mask and an extended light source are used, or to high-speed sintering (HSS) wherein a material that increases (absorption sintering) or reduces (inhibition sintering) the absorption of the radiation at the corresponding positions may selectively be applied onto the building material, whereupon irradiation is unselectively carried out by a large-area irradiation or by means of a moveable row irradiator.

Instead of the introduction of energy, the selective solidification of the applied building material may, for example, also be achieved by other methods such as 3D printing, for example by means of the application of an adhesive. In general, the invention relates to the additive manufacturing of an object by means of a layer-by-layer application and selective solidification of a building material not depending on the manner in which the building material is solidified.

The invention claimed is:

1. A manufacturing device for generatively manufacturing a three-dimensional object by layerwise application and selective solidification of a building material, wherein the manufacturing device comprises:

a building base having a building surface on which the object is to be built; and a lifting system including:
  a holding device which supports and holds the building base, wherein the holding device comprises: an upper connecting part; and two opposing side parts, each of the side parts extending vertically downward from the upper connecting part and forming a free space between the side parts, the building base being attached to a bottom end of the side parts opposite to the upper connecting part so that the building surface faces towards the upper connecting part; and
  a drive for actuating the holding device to vertically move the upper connecting part and the side parts to lower or raise the building base;
a recoater for applying the building material to the building base or a previously applied building material; and
a solidification device for selectively solidifying the applied building material at locations corresponding to a cross-section of the object to be manufactured,
wherein the manufacturing device is designed and/or controlled to repeat the steps of application and selective solidification until the object is completed, and to lower the building base by of the holding device by a predetermined height before each step of applying a new layer.

2. The manufacturing device according to claim 1, further comprising a spindle drive for adjusting a height adjustment of the holding device.

3. The manufacturing device according to claim 2, wherein the spindle drive comprises a drive unit which is arranged on the upper connecting part of the holding device.

4. The manufacturing device according to claim 2, wherein the spindle drive comprises a spindle axis which is arranged above a location of the holding device provided for holding the building base.

5. The manufacturing device according to claim 1, wherein the holding device is formed as a frame which comprises the free space in its interior.

6. The manufacturing device according to claim 1, further comprising a spindle drive for adjusting a height of the holding device,
  wherein the spindle drive includes a spindle axis disposed above the solidification device.

7. The manufacturing device according to claim 1, wherein the holding device is formed as a frame having the free space in its interior, and the solidification device or at least a part thereof is arranged in the free space within the frame.

8. The manufacturing device according to claim 1, wherein the solidification device comprises an irradiation device capable of selectively directing a radiation suitable for solidifying the building material onto the locations of the applied building material corresponding to the cross-section of the object to be manufactured.

9. The manufacturing device according to claim 1, further comprising a building shaft into which the building base can be lowered.

10. The manufacturing device according to claim 9, wherein the building base can be lowered in a direction of a bottom of the building shaft.

11. A method for generatively manufacturing a three-dimensional object by layerwise application and selective solidification of a building material using the manufacturing device according to claim 1, comprising the steps:

attaching the building base to the underside of the holding device of the lifting system so that the building surface faces towards the holding device;
lowering the building base by the holding device by a predetermined height;
applying a layer of the building material to the building base or a previously applied layer by a recoater; and
solidifying the applied layer selectively at locations corresponding to a cross-section of the object to be manufactured by means of a solidification device, wherein the steps of lowering, applying and solidifying are repeated until the object is completed.

12. The manufacturing device according to claim 10, wherein the building base can be lowered down to the bottom of the building shaft.

13. The method according to claim 11, wherein the building material is a powder.

14. A manufacturing device for generatively manufacturing a three-dimensional object by layerwise application and selective solidification of a building material, wherein the manufacturing device comprises:
  a building shaft extending from an upper border in a downward direction to a bottom of the building shaft, the building shaft delimiting a building space in which the three-dimensional object is built, wherein the upper border of the building shaft defines a first plane and the bottom of the building shaft defines a second plane, and the first and second planes are arranged to be stationary within the manufacturing device;
  a building base located in the building shaft and having a building surface on which the object is built; and
  a lifting system including a holding device which supports and holds the building base, wherein the lifting system is adapted to vertically advance the building base so that it-the building base moves towards the first or second plane, wherein the holding device comprises an upper connecting part and two opposing side parts, each of the side parts extending vertically downward from the upper connecting part and forming a free space between the side parts, the building base being attached to a bottom end of the side parts opposite to the upper connecting part so that the building surface faces towards the upper connecting part;
  a recoater for applying the building material to the building base or a previously applied building material; and
  a solidification device for selectively solidifying the applied building material at locations corresponding to a cross-section of the object to be manufactured,
  wherein the manufacturing device is designed and/or controlled to repeat the steps of application and selective solidification until the object is completed, and to lower the building base by of the holding device by a predetermined height before each step of applying a new layer.

15. The manufacturing device according to claim 14, further comprising a solidification device for selectively solidifying the applied building material at locations corresponding to a cross-section of the object to be manufactured, wherein the solidification device defines a third plane arranged to be stationary within the manufacturing device.

16. The manufacturing device according to claim 1, further comprising a recoater movable in a horizontal direction for applying the building material to the building base or a previously applied building material in such a way that the recoater moves through the free space formed between the side parts of the holding device to apply the building material.

17. A manufacturing device for generatively manufacturing a three-dimensional object by layerwise application and selective solidification of a building material, wherein the manufacturing device comprises:
- a supply of powder build material;
- a building base having a building surface on which the object is to be built;
- a lifting system which moves the building base vertically in relation to a horizontal building plane;
- a recoater member mounted for movement across at least part of the building plane and traversing a build area corresponding to an area defined by the building surface, the recoater member receiving powder from the supply and spreading powder in respective consecutive layers over the build area;
- a container forming an elevator shaft enclosed by sidewalls within which the building base moves vertically with the lifting system, the lifting system including a holding device which supports and holds the building base, the holding device having two opposed side parts between which the holding device is attached and to which the building base is affixed, the two parts forming a frame that vertically moves within the elevator shaft defined by the container, and wherein a space is defined between the opposed side parts through which the recoater member moves to spread powder over the build area; and
- a drive for the holding device that vertically moves the holding device with the building base within the container, the drive being mounted in a manner to move the holding device without the building base being engaged from below the building base by the drive.

18. The manufacturing device according to claim 17, wherein the drive is arranged above the holding device.

19. A manufacturing device for generatively manufacturing a three-dimensional object by layerwise application and selective solidification of a building material, wherein the manufacturing device comprises:
- a supply of powder build material;
- a building base having a building surface on which the object is to be built;
- a lifting system which moves the building base vertically in relation to a horizontal building plane;
- a recoater member mounted for movement across at least part of the building plane and traversing a build area corresponding to an area defined by the building surface, the recoater member receiving powder from the supply and spreading powder in respective consecutive layers over the build area;
- a container forming an elevator shaft enclosed by sidewalls within which the building base moves vertically with the lifting system, the lifting system including a holding device which supports and holds the building base, the holding device having two opposed side parts between which the holding device is attached and to which the building base is affixed, the two parts forming a frame that vertically moves within the elevator shaft defined by the container, and wherein a space is defined between the opposed side parts through which the recoater member moves to spread powder over the build area; and
- a drive for the holding device that vertically moves the holding device with the building base within the container, the drive being mounted in a manner to move the holding device without the building base being engaged from below the building base by the drive;
- a solidification device for selectively solidifying the applied building material at locations corresponding to a cross-section of the object to be manufactured,
- wherein the manufacturing device is designed and/or controlled to repeat the steps of application and selective solidification until the object is completed, and to lower the building base by of the holding device by a predetermined height before each step of applying a new layer.

* * * * *